Oct. 18, 1966
F. H. BANDLOW
3,279,681
BLOWER
Filed March 18, 1964
3 Sheets-Sheet 1
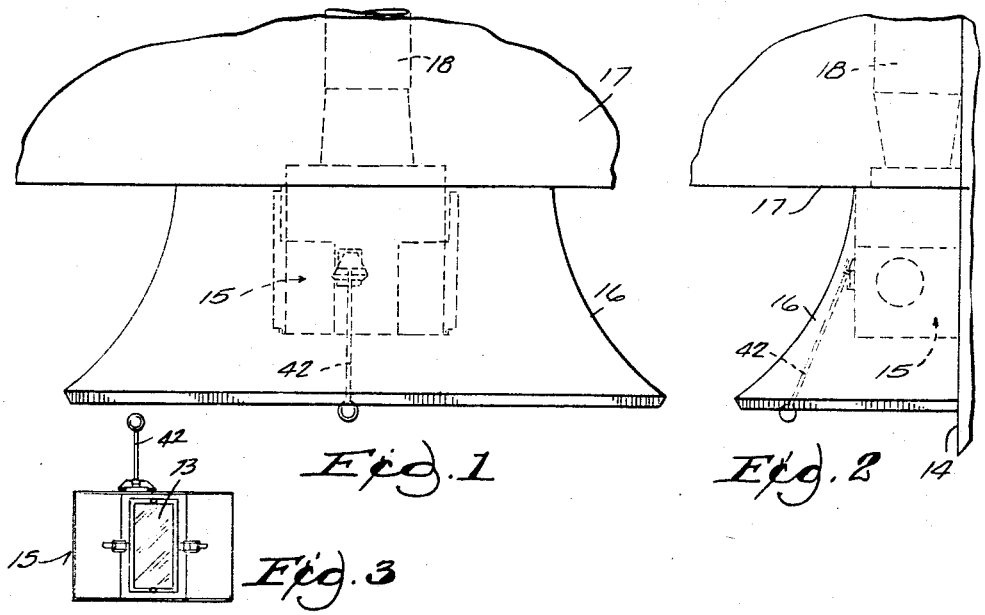
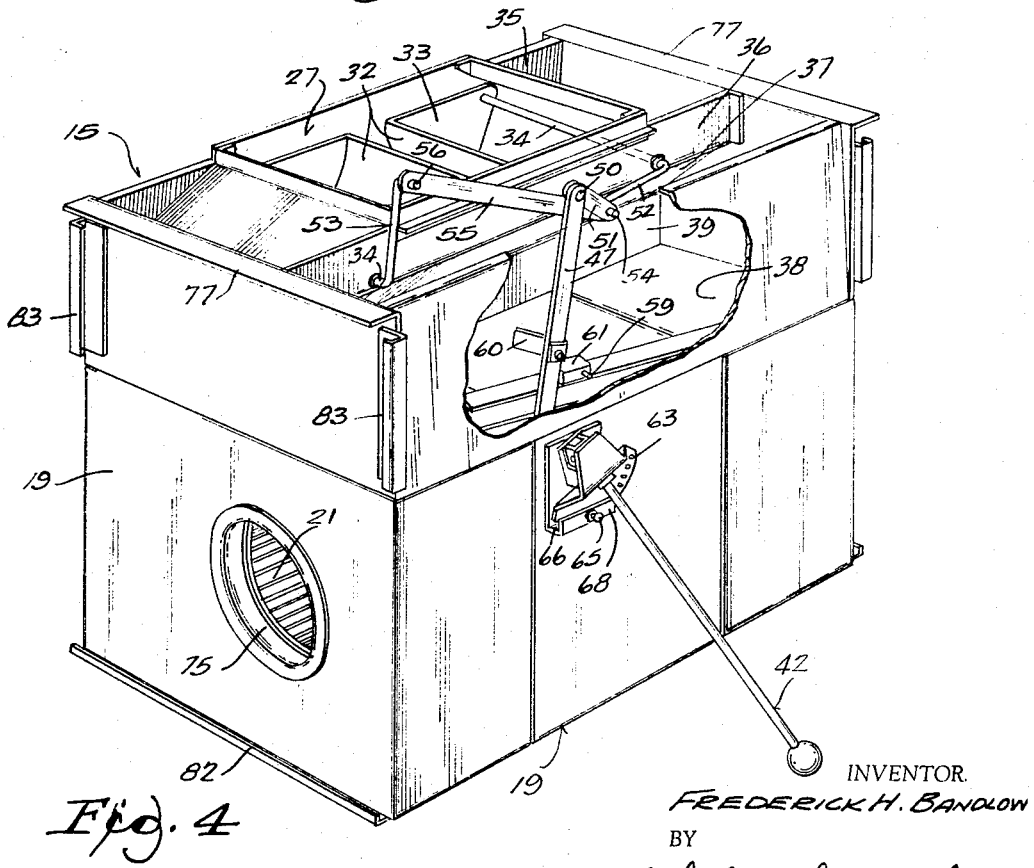
INVENTOR.
FREDERICK H. BANDLOW
BY
Wheeler, Wheeler & Wheeler
ATTORNEYS Oct. 18, 1966   F. H. BANDLOW   3,279,681
BLOWER
Filed March 18, 1964   3 Sheets-Sheet 2
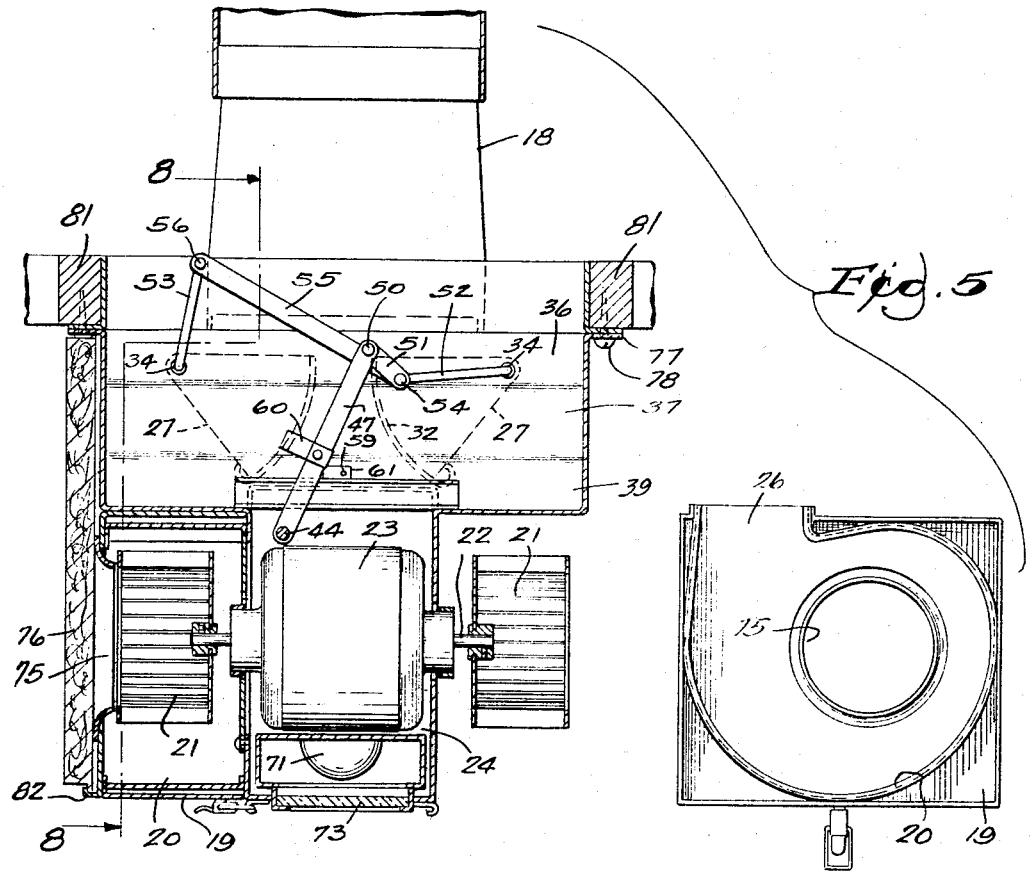
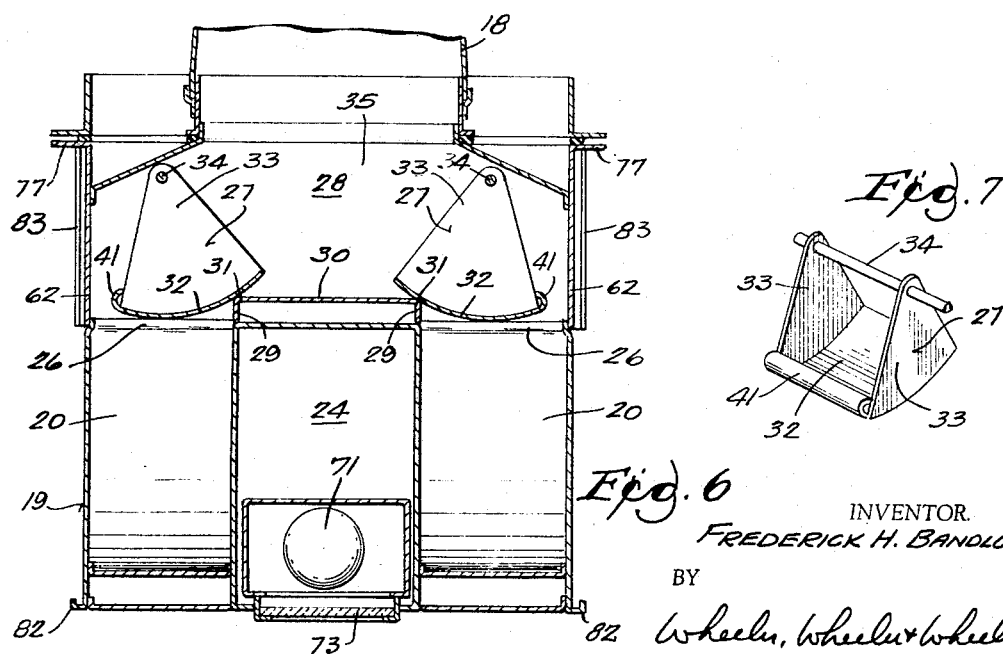
INVENTOR.
FREDERICK H. BANDLOW
BY
Wheeler, Wheeler & Wheeler
ATTORNEYS

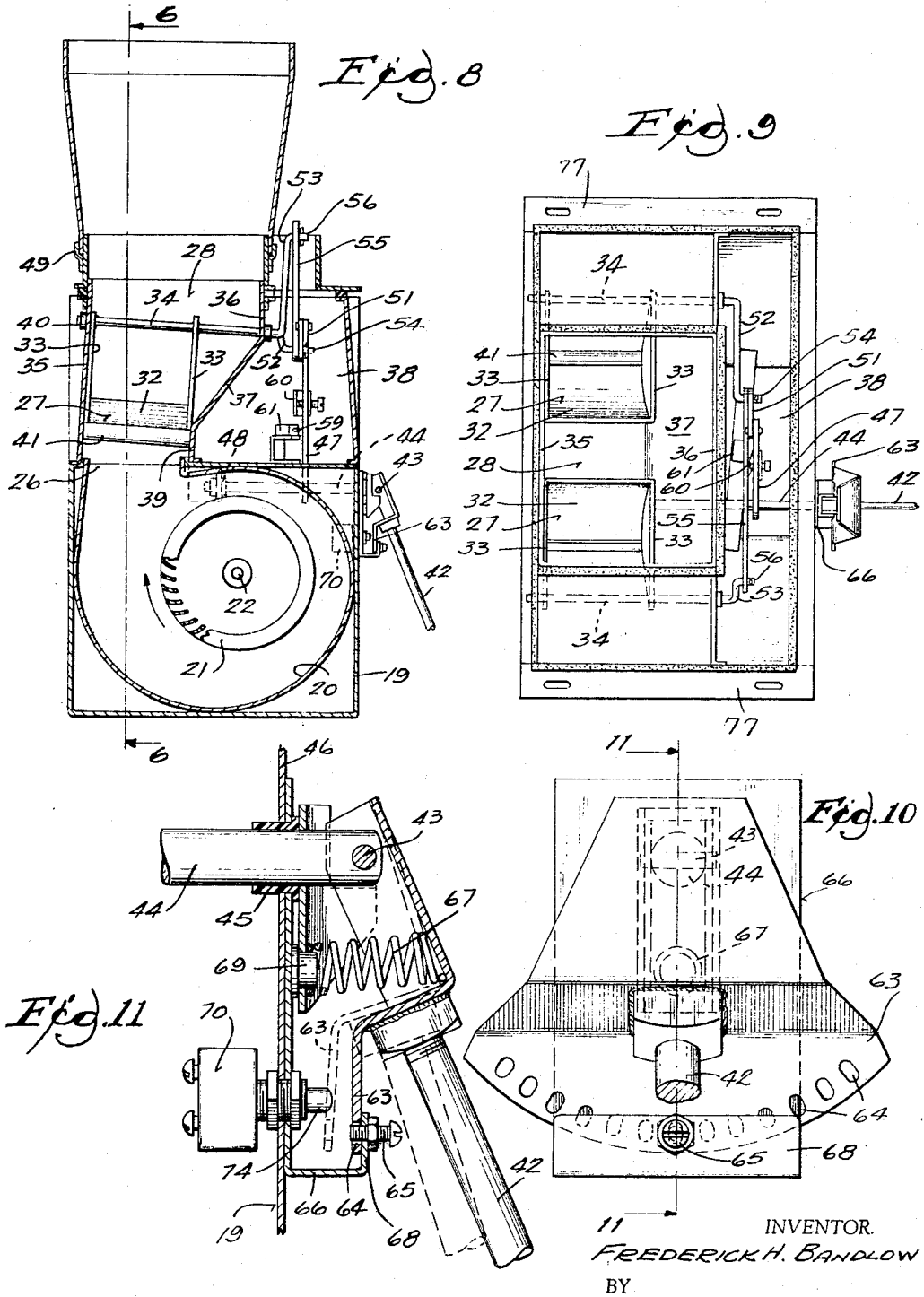

United States Patent Office 3,279,681
Patented Oct. 18, 1966

1

3,279,681
BLOWER
Frederick H. Bandlow, Theresa, Wis., assignor to Broan Mfg. Co., Inc., Hartford, Wis., a corporation of Wisconsin
Filed Mar. 18, 1964, Ser. No. 352,809
4 Claims. (Cl. 230—114)

This invention relates to a blower. As illustrated in the present application, the blower has features which particularly adapt it for incorporation in a barbecue or similar cooking hood.

The blower of the present invention has a high capacity adapted to exhaust fumes which are generated in relatively large quantities from barbecuing or the like. The blower is characterized by a damper arrangement by which the capacity of the blower can be varied from about 300 c.f.m. to 900 c.f.m. simply by adjusting the dampers and without requiring any change in motor speed. Accordingly, the discharge or output of the blower is regulated solely by adjusting the position of the dampers.

In preferred embodiments of the invention, the dampers are rotatable on axes so related to the path of air flow that there is no substantial component of air pressure tending to displace the dampers from any set position.

Novel linkage mechanism is provided in a dual blower construction in which both dampers are controlled by swinging a common lever. A motor switch is also actuated by the same lever, thus to energize the motor when the dampers are moved toward open position and to de-energize the motor when the dampers are moved toward closed position. A lamp for illuminating the cooking area is also provided, and this lamp has a separate switch which is desirably actuated by the same lever as is used to control damper position.

Other objects, features and advantages of the invention will appear from the following disclosure in which FIGURE 1 is a diagrammatic view illustrating a blower embodying the present invention as incorporated in a barbecue hood.

FIGURE 2 is a diagrammatic side view of the apparatus shown in FIGURE 1.

FIGURE 3 is an inverted plan view of the blower portion of the apparatus shown in FIGURES 1 and 2.

FIGURE 4 is an enlarged perspective view of a blower embodying the present invention, portions of the casing being broken away to expose linkage mechanism.

FIGURE 5 is a view partly in cross section taken through a blower of the present invention, parts of the blower casing being omitted to expose details of construction and the scroll housing for one of the squirrel cage fan elements being shown in spaced apart relationship.

FIGURE 6 is a cross sectional view taken along the line 6—6 of FIGURE 8.

FIGURE 7 is a perspective view of one of the dampers.

FIGURE 8 is a cross section taken along the line 8—8 of FIGURE 5.

FIGURE 9 is a plan view of the blower.

FIGURE 10 is an enlarged detailed view of the control lever detent mechanism.

FIGURE 11 is a cross section taken along the line 11—11 of FIGURE 10.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Like parts in different views are given the same reference characters.

The blower 15 of the present invention may typically

2 be mounted in a barbecue hood 16 which is mounted beneath a soffit 17 in a building. The hood 16 may be disposed over a cooking island or against a wall 14, as illustrated. An air duct 18 is incorporated in the soffit to exhaust fumes collected by the hood.

The blower of the present invention has a variable capacity, typically from 300 c.f.m. to 900 c.f.m., and comprises a housing indicated generally by reference character 19 which is compartmented to provide two laterally spaced scroll chambers 20 for the dual centrifugal fans 21 mounted on the armature shaft 22 of a common electric motor 23 in motor chamber 24.

The respective scroll housings 20 have discharge throats 26 which may be selectively partially or completely closed by dampers 27. Beyond the dampers the air impelled by the fans 21 through the laterally spaced ducts 20 merge in a damper housing 28 which spans between the laterally spaced scroll housings 20 and merge into the outlet duct 18.

As best shown in FIGURE 6, the respective laterally spaced side walls 29 of the scroll housings 20 intersect a bottom wall 30 of the damper housing 28 to form rectilinear edges 31 against which the curved plates 32 of the dampers 27 sweep in the course of damper movement.

The respective dampers 27 are best shown in FIGURE 7. They each consist of a curved plate 32 connected by end sectors 33 to a pivot pin or shaft 34 journalled in the side walls 35, 36 of the damper housing 28, as shown in FIGURE 8.

Wall 36 has an obliquely inclined portion 37 and a substantially parallel portion 39, as shown in FIGURE 8. Walls 36, 37, 39 isolate the damper housing 28 and air flow path therethrough from chamber 38 which contains the control linkage mechanism. Walls 35 and 36 provide bearing supports for damper shafts 34. Wall 35 may be inclined forwardly slightly from bottom to top and shafts 34 may be slightly inclined from rear to front, as shown in FIGURE 8, to leave room for shaft bearing 40 and the slip connections 49 between the blower and duct 18, all within the periphery of the blower housing.

The curved plates 32 of the dampers 27 have corresponding edges 41 curved on a relatively large radius to easily sweep past the edges 31 when the dampers are moved from fully open position into the air flow path through the ducts formed by the scroll housings 20.

The respective damper shafts 34 are spaced from the housing edges 31 the same distance as the radii of the curved plates 32. Accordingly, plates 32 will substantially seal against the edges 31 in any position of adjustment of the dampers, as, for example, the nearly closed position thereof shown in FIGURE 6 and the wide open position thereof shown in FIGURE 5.

The position of the dampers 27 is controlled by a swing lever 42 which is connected by pin 43 to rock shaft 44. Shaft 44 easily rotates on the bearing 45 (FIGURE 11) mounted in front wall 46 of the blower housing 19, and on bearing 48 within the blower.

Motion is transmitted from the rock shaft 44 to the respective dampers 27 through crank arm 47 which is welded or otherwise fixed to the arm 44 and which is, in turn, pivotally connected on pin 50 to link 51. The respective shafts 34 of the dampers 27 are turned to form crank arms 52, 53. Arm 52 of one of the dampers 27 has its end turned at 54 and is pivotally connected to the link 51 and is also pivotally connected to a transfer link 55 which is pivotally connected to crank arm 53 on the turned end 56 thereof.

Accordingly, rotation of shaft 44 is transmitted through the respective links and arms 47, 51, 52 to the shaft 34 for one of the dampers 27 and through links and arms 47, 51, 55, 53 to the shaft 34 of the other damper 27. The linkage is such that when the lever arm 42 is rotated clockwise, as in FIGURE 4, the linkages will move the dampers toward their closed position. When lever 42 is rotated counterclockwise, the dampers will move toward their open position.

Link 47 carries thereon a cam blade 60 which engages the actuator button 59 of switch 61 for motor 23 in the course of movement of the linkages. When the dampers are moved toward closed position and reach the position illustrated in FIGURE 6 in which there is only about a ¾ inch opening between the leading edges 41 of the dampers and the side walls 62 of the housing 19, blade 60 will depress switch button 59 and de-energize the motor 23. Conversely, on moving the linkages and dampers toward open position, the cam blade 60 will release the switch button 59 to energize the motor 23 when the leading edges 41 of the dampers have a spacing from the wall 62 greater than ¾ inch. Accordingly, the motor 23 is controlled by the same lever 42 that controls dampers.

Moreover, the discharge or output of the centrifugal fans 21 and the power consumption of the motor 23 is also controlled solely by the position of the dampers. The dampers 27 are downstream from the fans 21. When the dampers are in their minimum open position (¾ inch spacing as shown in FIGURE 6) the outlet throats 26 of the scroll housings 20 are throttled and relatively little air will be handled by the fans (approximately 300 c.f.m.), thus to reduce the load on and the power requirements of the motor 23. As the dampers are opened wider, the quantity of air discharged by the fans 21 will increase (approximately 900 c.f.m. at wide open position), thus to increase the fan load and power requirements of the motor 23.

Fan speed will be substantially constant throughout the range of damper movement because a motor with a steep torque curve is desirably employed in the blower of the present invention, thus to maintain substantially constant motor speed throughout its load range.

The shafts 34 for the dampers 27 are substantially centered with respect to the cross section of scroll housing throats 26 and to the air moving therethrough. Accordingly, there is no substantial component of air pressure against the damper plates 32 tending to displace the dampers from any set position.

Note that in their fully opened positions, the baffle plates 32 of the dampers are withdrawn laterally away from the path of air flow through the outlet throats 26 of the scroll housings. Accordingly, the dampers do not interefere with free movement of air when the dampers are in their fully opened positions.

To positively hold the dampers in any set position, the control handle 42 is provided with a sector plate 63 having a series of holes 64 disposed on the arc of movement of the plate 63 and which aligns with a detent bolt 65 which is mounted in the front flange 68 of channel bracket 66 behind which the outer margin of the plate 63 is confined during movement of the handle 42. The sector plate 63 is biased forwardly by spring 67 to engage one or another of the sector plate holes 64 with the detent bolt 65. The base of spring 67 is seated around stud 69.

Accordingly, the lever 42 must first be pushed inwardly against the bias of spring 67 until the plate 63 clears the detent bolt 65, whereupon the lever 42 may be swung laterally to turn the shaft 44. When the dampers reach a desired position, inward pressure on the arm 43 may be released and one or another of the holes 64 seated about the detent bolt 65 under the outward bias of spring 67.

Mounted on the rear of housing wall 46 and bracket 66 is a switch 70 in the circuit to a lamp bulb 71 which is in the bottom portion of the motor housing 24 and which illuminates the cooking area through a transparent lens 73. The lamp bulb 71 may be selectively energized or de-energized simply by pushing the control handle 42 inwardly far enough to engage the sector plate 63 with push button 74 for the switch 70. Button 74 is a push on-push off control for the switch 70 and is normally laterally beyond the range of swinging movement of sector plate 63, thus to require an extra push on the lever 42 to actuate the switch 70. Accordingly, the same control lever 42 which positions the dampers controls the switch for the lamp 71, but in a different motion thereof.

In preferred embodiments of the invention, the eyes 75 of the blower fans 21 are covered by removable filters 76. These are supported on bottom flanges 82 and side flanges 83.

The housing 19 is provided with flanges 77 by which the blower may be supported by screws 78 or the like from soffit frame members 81.

I claim:
1. A blower comprising two laterally spaced air ducts, a common damper chamber into which said ducts discharge air and which spans between said ducts, an air impeller for each duct and a damper for each duct, said dampers comprising damper plates and pivot pins on which said plates swing, said plates being curved on radii equal to the spacing from the plates to the pivot pins, and means for swinging the damper plates about their pivot pins to concurrently open and close the dampers, said damper chamber intersecting the ducts along edges, the pivot pins being spaced from said edges substantially the same distance as the radius of the plates for continuous sealing of said plates against said edges throughout damper movement.

2. A blower comprising two laterally spaced air ducts, a common damper chamber into which said ducts discharge air and which spans between said ducts, an air impeller for each duct and a damper for each duct, said dampers comprising damper plates and pivot pins on which said plates swing, said plates being curved on radii equal to the spacing from the plates to the pivot pins, and means for swinging the damper plates about their pivot pins to concurrently open and close the dampers, said damper plates swingable into the portion of the damper chamber which spans between the ducts when the dampers are moved toward open position.

3. A blower comprising two laterally spaced air ducts, a common damper chamber into which said ducts discharge air and which spans between said ducts, an air impeller for each duct and a damper for each duct, said dampers comprising damper plates and pivot pins on which said plates swing, said plates being curved on radii equal to the spacing from the plates to the pivot pins, and means comprising a single lever and linkage means interconnecting the lever with the dampers for swinging the damper plates about their pivot pins to concurrently open and close the dampers, said air impellers having a motor, a switch for controlling said motor and means for actuating the switch when the dampers are almost closed.

4. A blower comprising two laterally spaced air ducts, a common damper chamber into which said ducts discharge air and which spans between said ducts, an air impeller for each duct and a damper for each duct, said dampers comprising damper plates and pivot pins on which said plates swing, said plates being curved on radii equal to the spacing from the plates to the pivot pins, and means comprising a single lever and linkage means interconnecting the lever with the dampers for swinging the damper plates about their pivot pins to concurrently open and close the dampers, in combination with a lamp and a switch for the lamp, and means for actuating said switch when the lever is moved in a direction different from which it is moved to move the dampers.

References Cited by the Examiner
UNITED STATES PATENTS

| | | | |
|---|---|---|---|
| 2,231,884 | 2/1941 | Carter | 230—129 |
| 2,373,497 | 4/1945 | Paiste | 230—129 |
| 2,511,382 | 6/1950 | Stonehouse | 230—114 |
| 2,971,451 | 2/1961 | Feig | 98—115 |

LAURENCE V. EFNER, *Primary Examiner.*